(12) United States Patent
Tevis et al.

(10) Patent No.: US 8,234,470 B2
(45) Date of Patent: Jul. 31, 2012

(54) DATA REPOSITORY SELECTION WITHIN A STORAGE ENVIRONMENT

(75) Inventors: Gregory John Tevis, Tucson, AZ (US); Ofer Peretz, Haifa (IL); Eran Raichstein, Haifa (IL); David Gregory Van Hise, Tucson, AZ (US); Oren Wolf, Bedford, MA (US); Uri Wolloch, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 12/547,412

(22) Filed: Aug. 25, 2009

(65) Prior Publication Data

US 2011/0055293 A1 Mar. 3, 2011

(51) Int. Cl.
*G06F 13/00* (2006.01)
*G06F 13/28* (2006.01)
*G06F 3/00* (2006.01)
*G06F 5/00* (2006.01)

(52) U.S. Cl. ............ 711/162; 711/170; 711/E12.002; 710/38

(58) Field of Classification Search ............ 711/162, 711/170, E12.002; 710/38
See application file for complete search history.

(56) References Cited

U.S. PATENT DOCUMENTS

| | | | |
|---|---|---|---|
| 5,608,865 A | 3/1997 | Midgely et al. | |
| 5,664,186 A | 9/1997 | Bennett et al. | |
| 6,148,383 A | 11/2000 | Micka et al. | |
| 6,401,098 B1 | 6/2002 | Moulin | |
| 6,446,085 B1 | 9/2002 | Gusler et al. | |
| 6,546,474 B1 | 4/2003 | Weigelt | |
| 6,647,400 B1 | 11/2003 | Moran | |
| 6,757,698 B2 | 6/2004 | McBride et al. | |
| 6,948,038 B2 | 9/2005 | Berkowitz et al. | |
| 6,985,901 B1 | 1/2006 | Sachse et al. | |
| 7,035,882 B2 | 4/2006 | Takeda et al. | |

(Continued)

FOREIGN PATENT DOCUMENTS

DE 199 37 423 4/2003

OTHER PUBLICATIONS

First Office Action dated Feb. 5, 2008, pp. 1-50, for U.S. Appl. No. 11/122,508 by inventors I. Mani-Meitav, et al.

(Continued)

*Primary Examiner* — Edward Dudek, Jr.
(74) *Attorney, Agent, or Firm* — David W. Victor; Konrad Raynes & Victor LLP.

(57) ABSTRACT

Described is a method, system, and computer program product for selecting a data repository within a computing environment. The data repository can exist on multiple target computing systems as a logical entity called a volume or a file system. When selecting at least one data repository, a data protection system of the computing environment analyzes the incoming data from a source computing system, in conjunction with information describing the data repositories. The data repository information, or repository characteristic information, can be stored on a repository volume table (RVT) of the data protection system. By determining a weighted selection score from the analysis of all the information available to the data protection system, the data protection system can intelligently select a data repository for storing data from the source computing system. Further, by tracking repository characteristic information on a continuous or periodic basis, the data protection system can enable emulated views of data that has been stored on the data repositories of the computing environment.

20 Claims, 7 Drawing Sheets

U.S. PATENT DOCUMENTS

| | | |
|---|---|---|
| 7,082,456 B2 | 7/2006 | Mani-Meitav et al. |
| 7,152,142 B1 | 12/2006 | Guha et al. |
| 7,155,465 B2 | 12/2006 | Lee et al. |
| 7,185,048 B2 | 2/2007 | Arakawa et al. |
| 7,343,459 B2 | 3/2008 | Prahlad et al. |
| 7,415,490 B2 * | 8/2008 | Takeda et al. ........................ 1/1 |
| 7,596,713 B2 | 9/2009 | Mani-Meitav et al. |
| 2002/0083120 A1 | 6/2002 | Soltis |
| 2003/0018656 A1 * | 1/2003 | Schutzman et al. .......... 707/203 |
| 2004/0098415 A1 | 5/2004 | Bone et al. |
| 2005/0071392 A1 * | 3/2005 | Sandorfi et al. ............... 707/204 |
| 2005/0154821 A1 * | 7/2005 | Furuhashi et al. ............. 711/112 |
| 2005/0216788 A1 | 9/2005 | Mani-Meitav et al. |
| 2005/0262168 A1 * | 11/2005 | Helliker et al. ............... 707/204 |
| 2006/0106818 A1 | 5/2006 | Reed et al. |
| 2007/0136381 A1 | 6/2007 | Cannon et al. |
| 2008/0177971 A1 | 7/2008 | Prahlad et al. |

OTHER PUBLICATIONS

Response dated Jul. 7, 2008, pp. 1-13 to First Office Action dated Feb. 5, 2008, pp. 1-50, for U.S. Appl. No. 11/122,508 by inventors I. Mani-Meitav, et al.

Final Office Action dated Oct. 14, 2008, pp. 1-14, for U.S. Appl. No. 11/122,508 by inventors I. Mani-Meitav, et al.

Response dated Feb. 11, 2009, pp. 1-9, to Final Office Action dated Oct. 14, 2008, pp. 1-14, for U.S. Appl. No. 11/122,508 by inventors I. Mani-Meitav, et al.

Notice of Allowance dated May 20, 2009, pp. 1-5, for U.S. Appl. No. 11/122,508 by inventors I. Mani-Meitav, et al.

\* cited by examiner

DATA REPOSITORY SELECTION WITHIN A STORAGE ENVIRONMENT

CROSS REFERENCE TO RELATED APPLICATIONS

This application is related to U.S. patent application Ser. No. 11/122,508 entitled "Fast Backup Storage and Fast Recovery of Data (FBSRD)," filed on May 4, 2005 and assigned to International Business Machines Corp., which is hereby incorporated by reference in its entirety.

TECHNICAL FIELD

The invention relates to computing environments wherein data operations performed by computing systems are stored in and recovered from intelligently selected data repositories.

BACKGROUND

Data operations, such as read and write operations, are commonly performed by all computers. Further, data operations can be combined to perform specialized data operations such as data backup and data recovery. For example, a data backup operation can group write operations on a daily basis to backup data during a "daily" data backup operation. In particular, data stored at a primary storage location can be selected for a backup operation and "backed up" or copied to a target storage location for safekeeping. Should the primary storage location lose the data, the backup data can be recovered from the target storage location by performing read operations at the target storage location.

When selecting the target storage location for a data backup operation, a selection process occurs to determine the location of the data to be stored. However, this selection process may not be optimized to consider the growing complexity of computing environments. For example, data backed up a target storage location in the United States may not have been the best location to store the data. Perhaps the data should have been stored at a target storage location overseas from the United States.

Accordingly, a process for selecting a data storage location should account for the growing complexity of computing environments while also improving access to the data.

SUMMARY

Described are embodiments of an invention for selecting a data repository within a computing environment. The data repository can exist on multiple target computing systems as a logical entity called a volume or a file system. When selecting at least one data repository, a data protection system of the computing environment analyzes the incoming data from a source computing system, in conjunction with information describing the data repositories. The data repository information, or repository characteristic information, can be stored on a repository volume table (RVT) of the data protection system. By determining a selection score from the analysis of all the information available to the data protection system, the data protection system can intelligently select a data repository for storing data from the source computing system. Further, by tracking repository characteristic information on a continuous or periodic basis, the data protection system can enable emulated views of data that has been stored on the data repositories of the computing environment. It should be appreciated that the present invention can be implemented in numerous ways, such as a process, an apparatus, a system, a device or a method on a computer readable medium. Several inventive embodiments of the present invention are described below.

For example, an embodiment of a computing device implemented method for performing data operations within a computing environment includes a repository volume table module storing repository characteristic information in a repository volume table (RVT). The method also selects a data repository for performing data operations by using a selection module, such that the selection module analyzes the repository characteristic information and incoming data information to select a data repository. Further, the method provides an emulated view of data stored on at least one data repository.

In yet another embodiment of a method of selecting a data repository of a distributed storage management system, the distributed storage management system contains at least one source computing system coupled to at least one target computing system. The method includes storing repository characteristic information in a repository volume table (RVT) of a data protection system of the distributed management system by using a repository volume table module. The method also includes selecting a data repository from at least one target computing system for performing data operations by using a selection module of the data protection system, such that the selection module analyzes the repository characteristic information and incoming data information from at least one source computing system to select a data repository. Further, the method provides an emulated view of data stored on an at least one data repository of at least one target computing system.

In an embodiment of a computing environment, the environment includes a source computing system having source information and a data protection system coupled to the source computing system, such that the data protection system includes a processor and memory. The memory stores instructions for obtaining repository characteristic information from a repository volume table (RVT) and selecting a data repository for performing data operations by using a selection module, such that the selection module analyzes the repository characteristic information and incoming data information to select a data repository. Further, the environment provides an emulated view of data stored on at least one data repository.

It should be appreciated that other aspects of the invention will become apparent from the following detailed description taken in conjunction with the accompanying drawings, which illustrates by way of example, principles of the invention.

DETAILED DESCRIPTION

The following embodiments describe a method and a system for selecting a data repository within a computing environment. For example, within a distributed storage management system of a computing environment, data from a source computing system may be stored on a target computing system within a data repository. The data repository can exist on one or many target computing systems as a logical entity called a volume or a file system. When selecting at least one data repository, such as a volume, from among many volumes, a data protection system of the computing environment analyzes the incoming data from the source computing system in conjunction with information describing the data repositories. The data repository information, or repository characteristic information, can be stored on a repository volume table (RVT) of the data protection system. By determining a selection score from the analysis of all the information available to the data protection system, the data protection system can intelligently select a data repository for storing data from the source computing system.

Further, by tracking repository characteristic information on a continuous or periodic basis, the data protection system can enable emulated views of data that has been stored on the data repositories of the computing environment. It will be obvious, however, to one skilled in the art, that embodiments of the present invention may be practiced without some or all of these specific details. In other instances, well known process operations have not been described in detail to prevent obscuring the embodiments of the present invention described herein.

Figure 1:
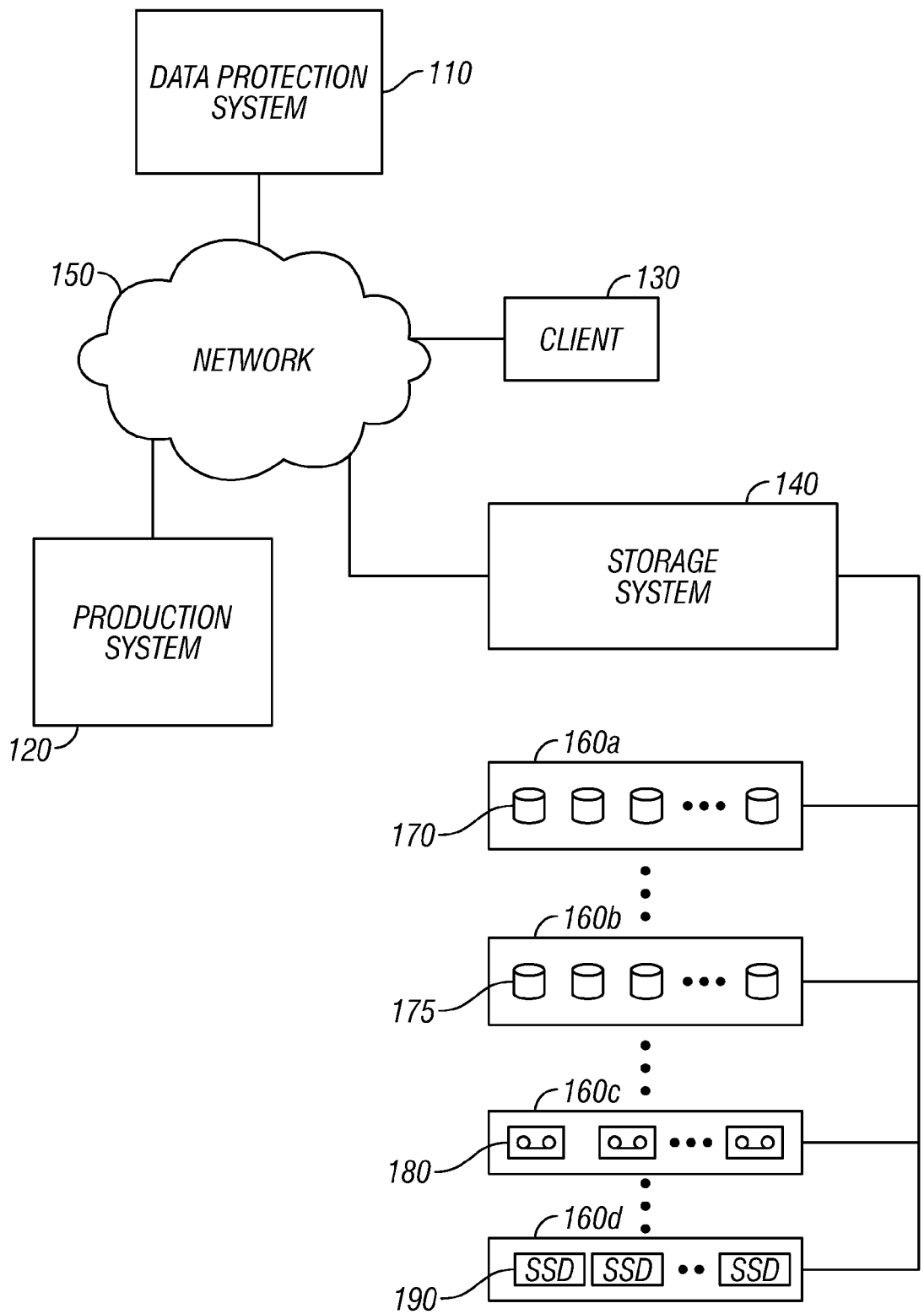
FIG. 1 is a diagram illustrating a computing environment that performs data operations in accordance with an embodiment of the invention.

In accordance with one embodiment, FIG. 1 is a diagram illustrating a computing environment that performs data operations, such as read and write operations. The computing environment includes multiple computing systems such as a data protection application system 110, a production system 120, a client 130, and a storage system 140 that communicate with each other via a network 150. It should be appreciated that the computing system can be any device capable of processing data, such as for example, a server, mainframe, personal computer, laptop, or mobile device, which includes smartphones and the like. A computing device can include components (not shown) such as at least one processor, memory, a network adapter, antenna, and local storage that are managed by an operating system. Many general or special purpose operating systems exist that manage the components of the computing system, such as Unix-type operating systems and Microsoft Windows-style operating systems. The operating systems organize data using "file systems," which are data repositories for files. Thus, it should be appreciated that along with volumes, file systems are examples of data repositories that represent a logical structure for storing data.

In practice, the local storage can be a magnetic disk drive or solid state storage device, such as a flash memory. Further, the computing device may include a user interface, such as a keyboard, touchscreen, or pointing device that enables user input. Finally, the computing device may include a user viewable screen displaying a graphical user interface (GUI) or text-based interface, such as a Command Line Interface (CLI).

The storage system 140 can also be connected to local or network storage devices (not shown). Such network storage devices can include Network Attached Storage (NAS) systems and devices of a Storage Area Network (SAN) network. Although not illustrated here, these storage devices are capable of performing embodiments of the present invention described herein. For simplicity, as illustrated by FIG. 1, storage devices, such as storage arrays, can include disk arrays 160a/160b, a tape array 160c, and a solid state device array 160d, which may be organized under a Redundant Array of Inexpensive/Independent Disks (RAID) level. The disk array 160a can include magnetic disks 170 and the disk array 160b can include optical disks 175. In contrast, the tape array 160c can include tapes 180 and the solid state device array 160d can include solid state devices (SSDs) 190. It should be appreciated that one may combine the magnetic disks, optical disks, tapes, and SSDs on a single array.

One of ordinary skill will realize that the network 150 includes any number of switches, routers, and other specialized network computing devices providing data transfer services between computing systems of the computing environment. Accordingly, the client 130 can bi-directionally communicate data to and from the production system 120. For example, the client 130 can include an email application (not shown) that communicates with a email database application (not shown) on the production system 120. Email data that resides on the production system 120 can be selected for backup operations by the data protection application system 110.

Specifically, the client 130 may request the services of the production system 120, by exchanging data packets over the network 150. The client 130 may issue data packets using file-based access protocols or block-based access protocols. Such protocols are common and include the Common Internet File System (CIFS) protocol, Network File System (NFS) protocol, Transmission Control Protocol/Internet Protocol (TCP/IP), Small Computer Systems Interface (SCSI) protocol encapsulated over TCP (iSCSI) and SCSI encapsulated over Fibre Channel (FCP). It should be appreciated that any computing system may communicate with any other computing system of the computing environment in this manner.

As a further example of performing data backup operations, source information from the production system 120 can be organized by the data protection system 110 for backup storage on any storage device accessible by the storage system 140. To enable data storage on a storage device, the storage system 140 may present logical representations of the physical storage devices as "volumes" to the data protection system. The volumes, or data repositories, represent any logical combination of physical disks, tapes, or SSDs, and can be selected by the data protection system 110 for storing backup data. By enabling data operations over a computing environment such as the one illustrated on FIG. 1, the computing environment can be a distributed storage management system.

Figure 2:
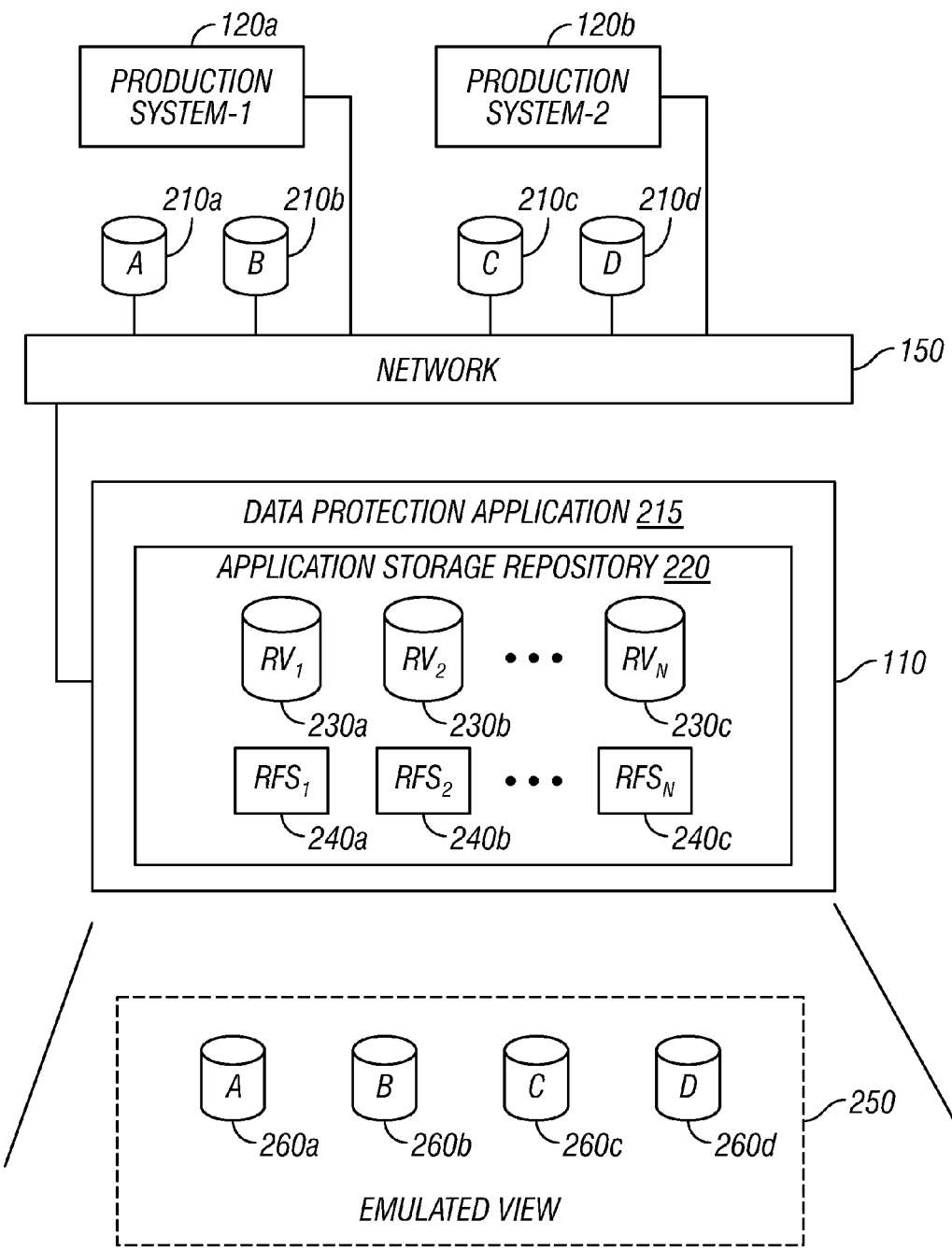
FIG. 2 is a diagram illustrating a data protection environment performing data operations on data repositories, in accordance with an embodiment of the invention.

For example, consider the distributed storage management system of FIG. 2, which illustrates a data protection environment performing data operations on data repositories. This exemplary embodiment includes two production systems, a production system-1 120a and a production-system-2 120b, which are computing systems. Further, the production systems are connected to the network 150 and data sources (DS), DS-A 210a, DS-B 210b, DS-C 210c, and DS-D 210d that contain data to be backed up. In some information technology environments, the source data is called primary, or production data. In this example, each data source is backed up by the data protection system 110 by a data protection application 215 that may reside on the data protection system 110. It should be appreciated that the data protection application 215 can be a software module, firmware module, or combination software/firmware module that enables data backups using the inventive concepts described herein. Further, although the example of the data protection application 215 resides on the data protection system 110, other embodiments can implement the data protection application 215 external to the data protection system 110. For example, the data protection application 215 can be implemented in another computing system of the distributed storage management system.

The data protection system 110 includes an application storage repository 220 that includes information about at least one data repository, such as a volume or file system. For example, the illustration includes information about a repository volume (RV) such as $RV_1$ 230a, $RV_2$ 230b, ..., $RV_N$ 230c and a repository file system (RFS) such as $RFS_1$ 240a, $RFS_2$ 240b, ..., $RFS_N$ 240c, where [1 .... N] denote any number of data repositories. Each data repository is a target data repository of an emulated view 250. Respectively, the target data repository-A 260a, data repository-B 260b, data repository-C 260c, and data repository-D 260d are the backups and logical views of the data sources DS-A 210a, DS-B 210b, DS-C 210c, and DS-D 210d. Details of information about data repositories will be described with respect to FIG. 3 and the selection of the data repositories will be described with respect to FIGS. 4A and 4B.

The emulated view 250 of the target data repositories is an instant access view of what the production data looked like during a period of time. Instant access views permit instant access and instant restore of backup data because at any point in time, the production data is represented in the target data repositories. To enable the emulated views, embodiments of the present invention permit the data protection system to intelligently select which data repositories should store the production data. Emulated views will be further described with respect to FIG. 4B.

Figure 3:
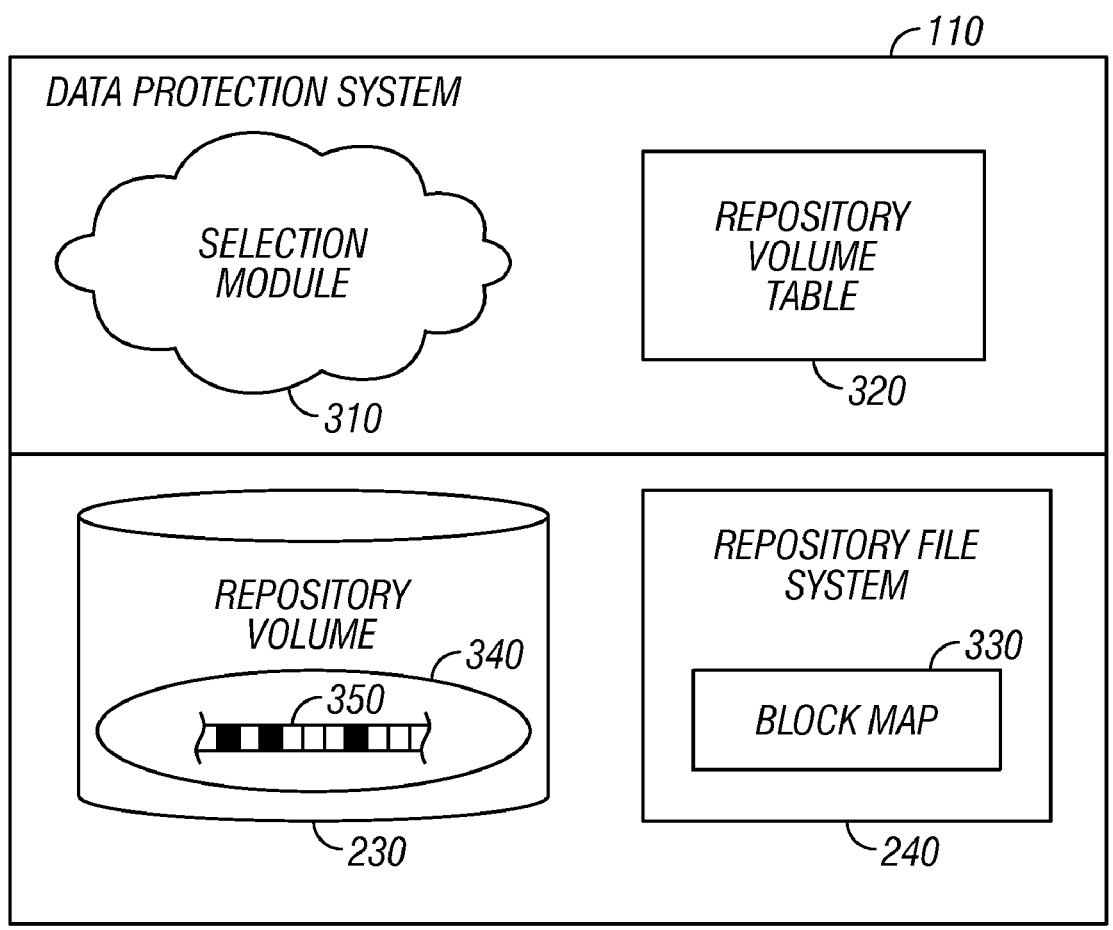
FIG. 3 is a diagram illustrating a selection module of a data protection system of a data protection environment, in accordance with an embodiment of the invention.

To further describe the operation of the data protection system 110, FIG. 3 illustrates a selection module 310 of the data protection system, in accordance with an embodiment of the invention. The selection module 310 includes algorithms implemented as software-only or software in combination with firmware to enable the intelligent selection of data repositories for data operations. For example, if the selection module 310 selects the repository volume 230 to store data, then a logical disk 340 can be selected to store the production data as data blocks 350. Alternatively, if the selection module 310 selects the repository file system 240 to store data, then a block map 330 can represent the location of stored data blocks. It should be appreciated that depending on the operating system and storage system, the production data may be stored and accessed as files or as blocks of file-based, block-based, or combination file-based/block-based storage systems.

The illustration also includes a repository volume table (RVT) 320 that can be a data structure embodied as a hierarchical database. However, it should be appreciated that any data structure, such as a tree, flat file, or hash table, implemented statically or dynamically in the computing system's memory, or local storage device, is possible for RVT 320 implementation. Populating the RVT 320 with information can occur during the initial startup of any computing system added to the computing environment; either through a detection mechanism or via an administrator populating the data structure. Thereafter, during the operation of the computing system, the RVT 320 information continually updates. For example, in one embodiment, the data protection application 215 can continuously update the RVT 320 during each data operation. In another embodiment, the data protection application 215 can update the RVT 320 when a new data repository, repository volume 230, or repository file system 240 is introduced to the data protection system 110.

The selection module 310 accesses information stored in the RVT 320 to select the repository volume 230 or repository file system 240. Specifically, the RVT 320 includes information for each data repository accessible to the data protection system 110 such as: the number of active jobs (incremental backups, delta backups, full backups, continuous data backup, etc.) impacting a data repository, the amount of available usable storage space that is available on a data repository, how active is a data repository with respect to multiple data operations occurring simultaneously (such as multiple backup and recovery read operations simultaneously occurring with backup write operations), the storage configuration of a data repository (RAID level and the like), the performance information of a data repository (RAID 5 is more reliable than RAID 0), the type of job that is requested by the data protection system 110 (full backups are more resource intensive than differential backups), and the affinity of the data blocks to a particular data repository (such as the importance of storing production data blocks together on one data repository). Concisely, the RVT information, also called the data repository criteria, include (1) number of current active jobs (2) capacity utilization (3) performance utilization (4) performance configuration (5) availability configuration (6) stored job affinity and (7) operation type.

In one embodiment, the repository volume or repository file system selection could be based statically upon the information stored in the RVT 320, also called characteristics, of the repository volumes or the volumes the repository file systems run on. These characteristics, which are stored in the RT 320, could include storage device read and write throughput, storage device performance capacities, storage device availability characteristics such as RAID levels, and storage device revolutions per minute (RPMs), storage array cache size, storage array processor speed, storage network attachment speeds, and the like. However, in another embodiment, the repository volume or repository file system selection could be based dynamically on current storage device read and write capacities, and upon the characteristics of the current data operation (read, write, amount of data, service level objectives, etc). In yet another embodiment, repository volume or repository file system selection could be based on a combination of static and dynamic means.

When a data protection operation initiates, the operation includes source information such as the original primary data source (including server name, volume name, application name, and the like) and predicted read and write sizes for the data protection operation, which can be estimated by the data protection system 110 or be an unknown value. Further, the information can include service level objectives for the performance of a target repository volume associated with source application volume being protected, such as high performance, medium performance, and low performance service levels. The RVT 320 information described above are criteria used by the selection module 310 to determine a selection score, later described with respect to FIGS. 4A and 4B, which is used to select a data repository. However, it should be appreciated that some or all of the information stored in the RVT 320 may or may not be used to create the selection score.

Figure 4A:
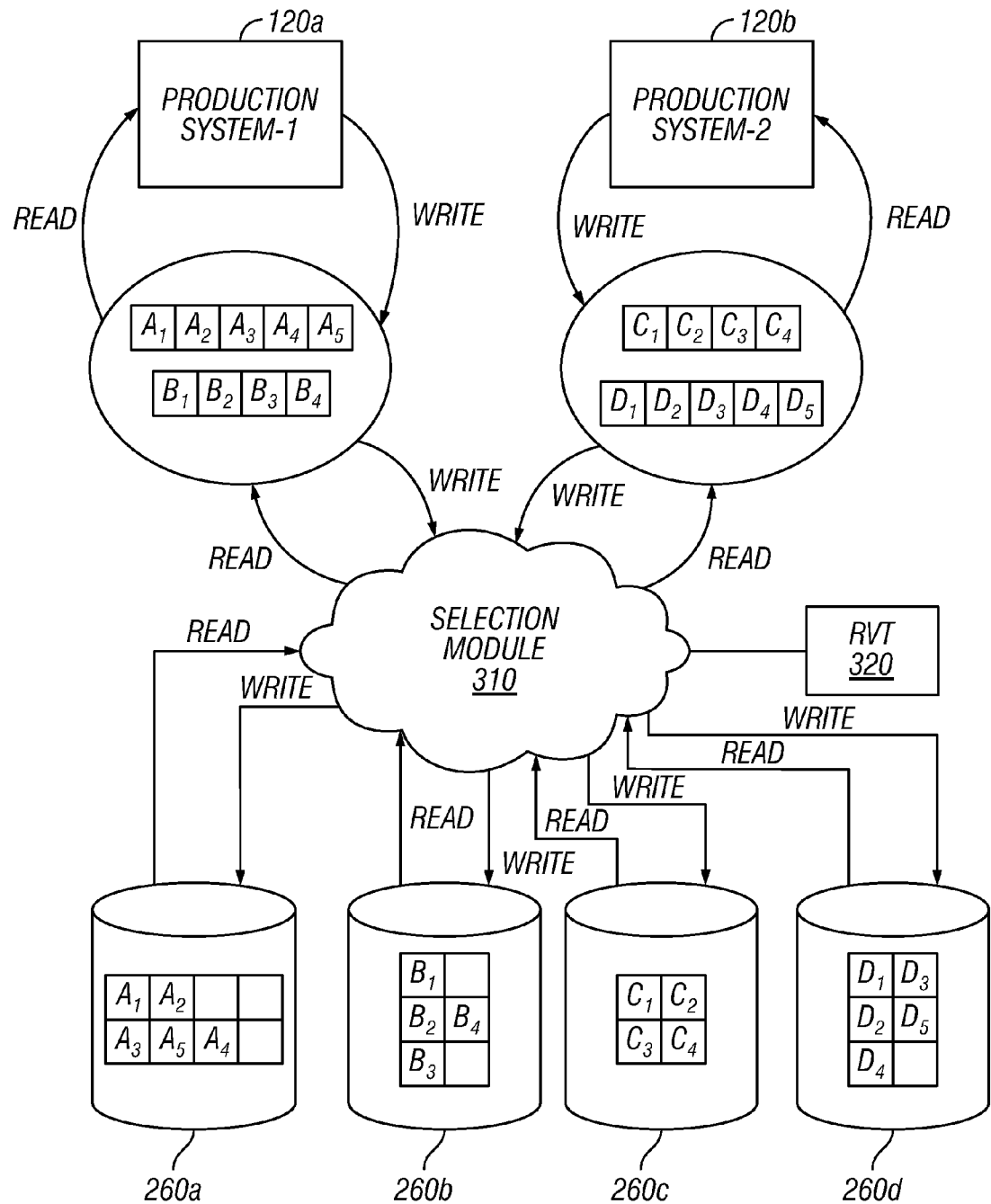
FIG. 4A is a diagram illustrating the performance of data operations with a selection module to select data repositories, in accordance with an embodiment of the invention.

Specifically, FIG. 4A illustrates the performance of data operations utilizing the selection module 310 to select data repositories 260a through 260d, in accordance with an embodiment of the invention. The illustration includes production system-1 120a and production system-2 120b, which can be application servers that have four data sets to backup. As a simple example of data sources, the four data sets are stored as blocks with data set A including blocks [$A_1$ through $A_5$], data set B including blocks [$B_1$ through $B_4$], data set C including blocks [$C_1$ through $C_4$], and data set D including blocks [$D_1$ through $D_5$]. The selection module 310 analyzes the RVT 320 information that describes characteristics of the data repositories. In combination with the RVT 320 information, the selection module 310 also analyzes the source information about the data sources to determine the selection score. In this example the highest selection score value will determine the data repository to select. However, it should be appreciated that in other embodiments, the lowest selection score value can determine the data repository to select.

In particular, a policy of the data protection application 215, which can be maintained by a system administrator or user, can require that all the data sets must be backed up in separate data repositories with the exception that all data blocks of the same data set must be stored together. Moreover, the policy can also require that any data set with more than four blocks must be stored on high speed repositories that have RAID-5 enabled. Thus, when a data protection operation begins, the selection module 310 is aware of the policy requirements and reads information from the RVT 320 to calculate a selection score. In this example, the RVT 320 includes information about data repository-A 260a and data repository-D 260d that they are high speed storage devices and moreover, have RAID-5 enabled. The RVT 320 also includes information that data repository-B 260b and data repository-C 260c are slower storage devices that are not protected by a RAID level.

Accordingly, when a data protection operation begins, such as a regularly scheduled full or incremental backup, for example, the data protection application 215 initiates the selection module 310. The selection module 310 analyzes the information regarding the data repositories and selects data repository-A 260a to store data set A blocks and data repository-D 260d to store data set D blocks because those data repositories are protected by RAID-5 and are high speed storage devices. Further, the selection module 310 analyzes the information regarding the data repositories and selects data repository-B 260b and data repository-C 260c to store data set B and data set C, respectively, because those data sets have no need for a data repository protected by a RAID level.

Figure 4B:
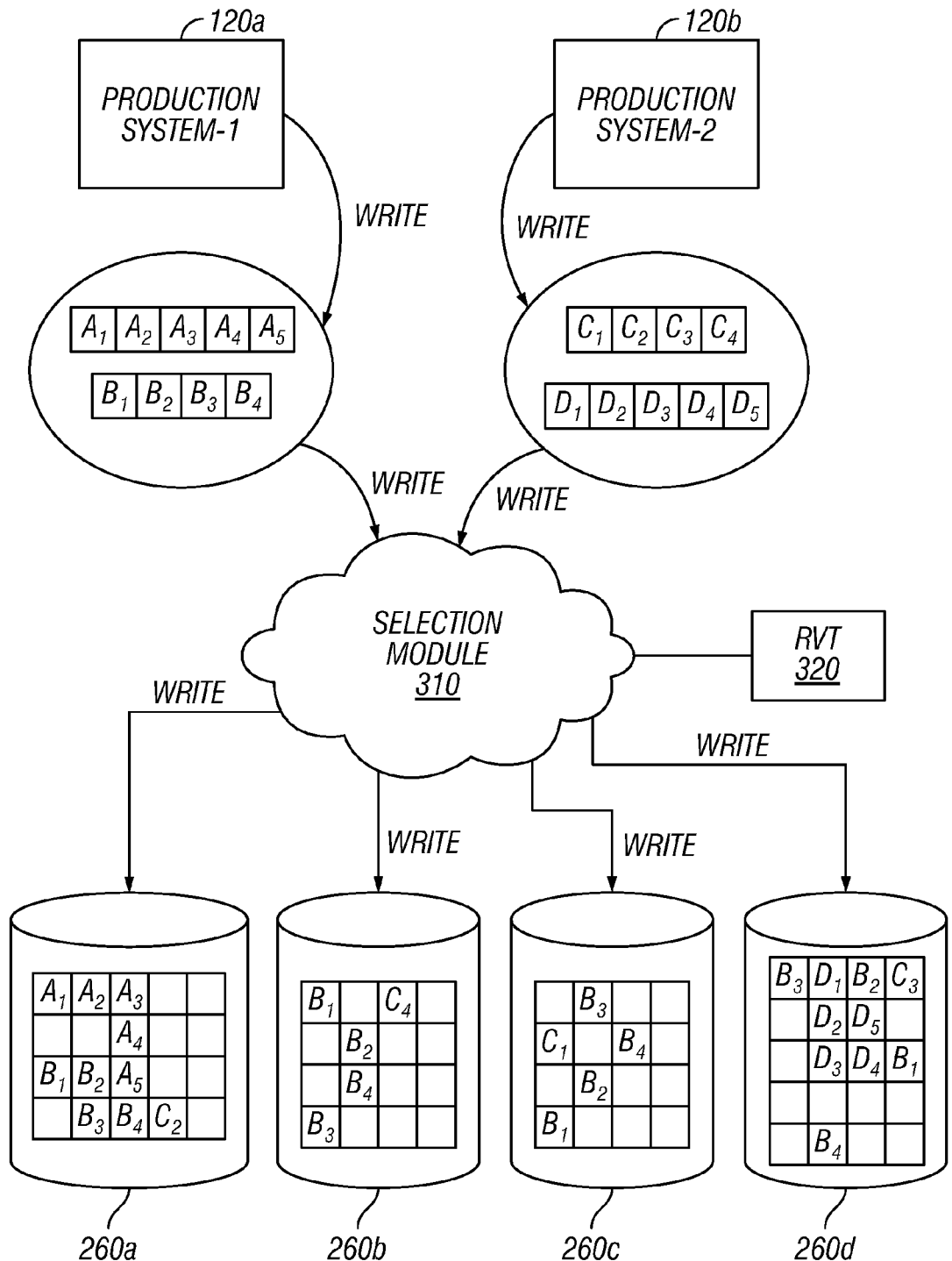
FIG. 4B is yet another diagram illustrating the performance of data operations with a selection module to select data repositories, in accordance with an embodiment of the invention.

In another embodiment illustrated by FIG. 4B, the selection module 310 may operate under a variation of the policy above. For example, assuming all the same data storage characteristics above, now there is no requirement to keep data set blocks together on the same data repository for data set C. However, for this embodiment, there is an extra requirement that data set B must be highly available. Accordingly, once more, the selection module 310 selects data repository-A 260a and data repository-D 260d as above. Then, instead of selecting a single data repository to store data set C, data set C blocks are dispersed across the first available data repository. The result is a dispersed data set C. Regarding data set B, since the policy requires the data set to be highly available, the data set is stored on every repository.

Thus, with the examples above, it should be apparent that data protection operations of any type, such as full backup/recovery, incremental backup, delta backup, continuous data protection, partial recovery, and the like can cause multiple read and write operations that trigger the operation of the selection module 310. Further, the selection module 310 can cause source data to be stored on various data repositories in various configurations. One effect of the data set configuration of FIG. 4B is the ability of the data protection system 310 to present an emulated view of the backup data. In particular, should data block $B_2$ of data repository-A 260 be unavailable because of a bad physical block, then an emulated view of data set B can be formed with data blocks $B_1$, $B_3$, and $B_4$ from data repository-A 260a and with data block $B_2$ from data repository-C 260c.

Figure 5:
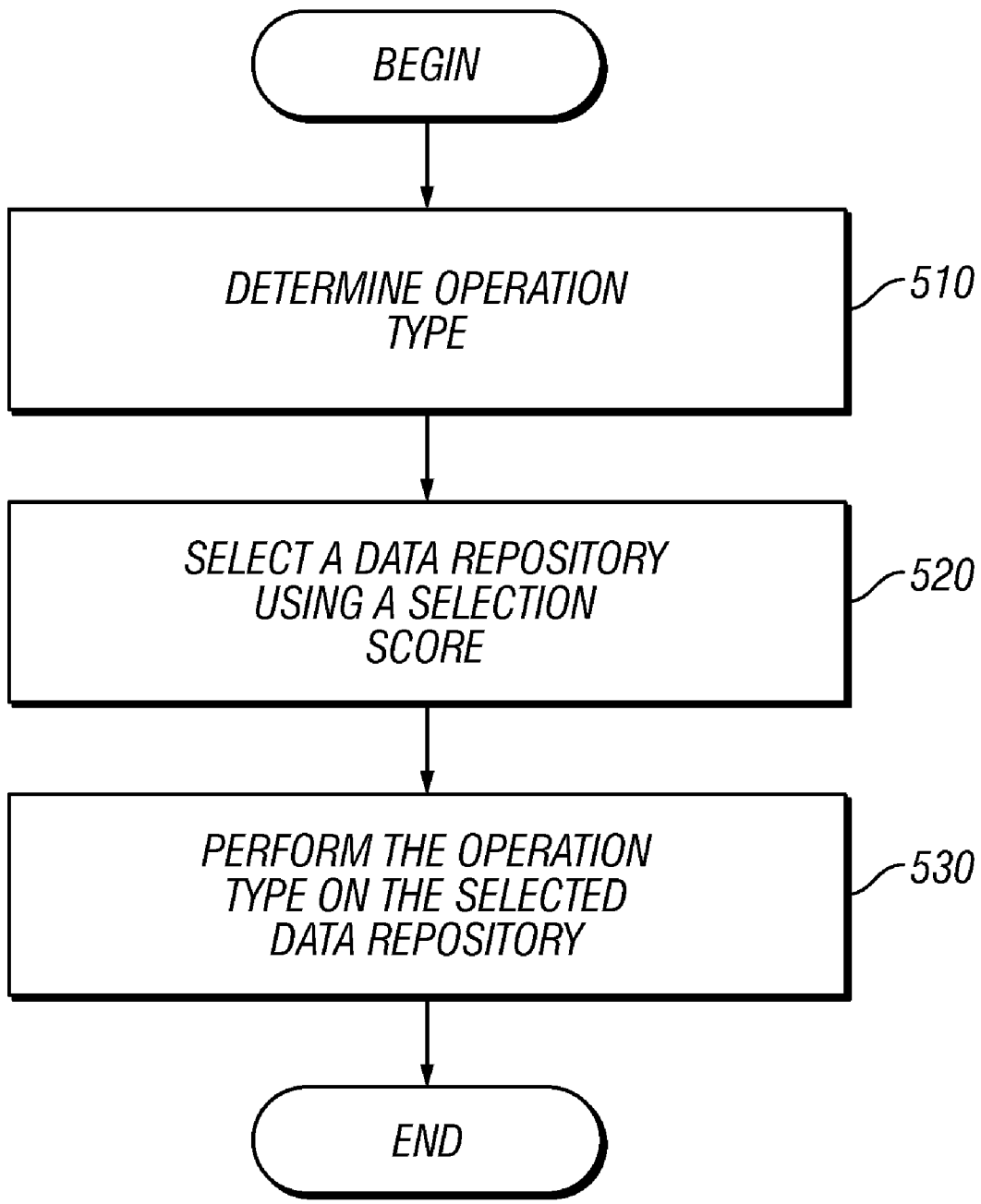
FIG. 5 is a flowchart of operations for the selecting data repositories, in accordance with an embodiment of the invention.

Accordingly, FIG. 5 is a flowchart of operations for selecting data repositories, in accordance with an embodiment of the invention. It should be appreciated that such operations can be embodied as a method implemented as an algorithm having software modules that are implemented by a computing system. Further, the method can be embodied as software on any computer readable media, as dedicated firmware or as a combination of software and firmware, and the like. The operations begin with module 510, where a data protection application determines the operation types that requires the selection of a data repository after a triggering event.

Triggering events such as backup and recovery generate operation types such as data read, data write, and data modify. Once the data protection application is aware of the operation type, such as a data write operation, the data protection application selects a data repository, such as a repository volume or repository file system in module 520. By using a selection module as further described with respect to FIG. 6, the data protection application selects the appropriate data repository to perform the data write operation. Thereafter, in module 530, a storage system in communication with the data protection application performs the operation type on the selected data repository, which in this example is a data write operation.

Figure 6:
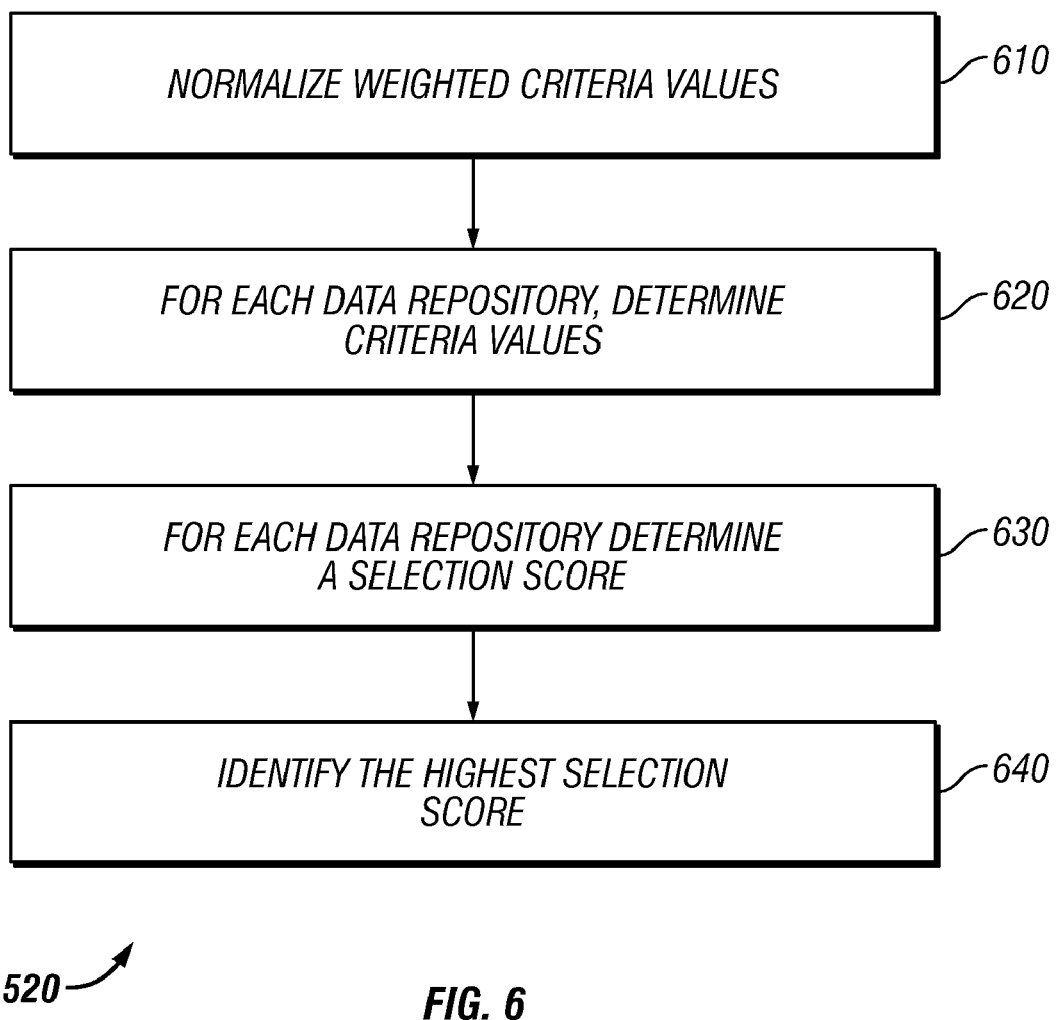
FIG. 6 is a flowchart of operations to determine a selection score to select data repositories, in accordance with an embodiment of the invention.

With respect to module 520, FIG. 6 illustrates a flowchart of operations to determine the selection score, in accordance with an embodiment of the invention. When performing the operations, they can occur continuously or periodically. For example, the operations can occur for every data operation. Alternatively, the operations can occur during specific events, such as a backup or recovery operation. To begin, module 610 describes the operation of normalizing weighted criteria values. These criteria values are the repository volume table (RVT) information that describes characteristics of the data repositories.

For example, the RVT information can include the current capacity utilization of a data repository, the free space available on a data repository, or the number of currently active jobs impacting a data repository. By weighting the RVT information with different values, it is easier to determine the relative values of the criteria to one another. For example, if all the RVT information is weighted by "1," that indicates that all the criteria have equal weight and no one criteria is of more importance than another criteria. However, if the weight value is "2", then some criteria weighted by "2" are more important than those criteria weighted by "1." It should be appreciated that any values can be used for weights. For example, the weights can range from zero to ten, [0 . . . 10], where zero indicated "no importance" and ten "highest importance." Any weight in-between is a sliding weight scale. Further, it should be appreciated that weights can be considered in a different order, where ten indicates "no importance" and zero indicates "highest importance." For simplicity, the remaining examples of the description assumes a normalized weight of "1," therefore indicating that all the RVT information are of equal importance relative to one another.

After weighting the RVT information, module 620 describes that for each data repository, determine the criteria values to use in calculating a selection score. Specifically, suppose a data write operation occurs for a backup operation. When reviewing the RVT information for a particular data repository, the information indicates that RAID-5 is enabled, the underlying physical storage is high speed magnetic disk, and the number of active jobs is "2." Further, the selection module is aware of a policy that the threshold value for any data repository to be considered "not busy" is ten. If the threshold is greater than ten, then the data repository is busy. Accordingly, the criteria value calculation is 10−2=8, which indicates that 8 more jobs are possible for the data repository. Instead, if the number of active jobs is "10," then the resulting calculation is 10−10=0, which indicates that no active jobs are possible for the data repository. Accordingly, if four data repositories are in contention to be selected by number of active jobs, the data repository that has a resulting calculation closer to 10 should have a better chance of being selected for use.

In operation 630, each data repository has criteria that have been calculated from operation 620. Specifically, consider the seven criteria of (1) number of current active jobs (2) capacity utilization (3) performance utilization (4) performance configuration (5) availability configuration (6) stored job affinity and (7) operation type. Each criteria can be represented by $[X_1, X_2, X_3, X_4, X_5, X_6, X_7]$, respectively, where the selection score is determined by adding the all $X_i$, where i is any value from 1 to 7. Therefore, the complete selection score calculation including the weighted values $W_i$, where i is any value from 1 to 7, is $(W_1*X_1)+(W_2*X_2)+(W_3*X_3)+(W_4*X_4)+(W_5*X_5)+(W_6*X_6)+(W_7*X_7)$. The higher the selection score, the higher the chance the data repository has of being selected for use.

Accordingly, in operation 640, the selection module identifies the data repository that has the highest selection score. It should be appreciated that the selection scores are point in time calculations. Thus, with multiple data operations occurring in a computing environment, the selection calculation can occur numerous times, whether continuously or during a scheduled time, such as once every hour for each data repository. The decision how many times the selection calculation can occur may depend on computing system usage and general impact on the computing environment. For example, if the selections score calculations are occurring too frequently and negatively impact computing system performance, then perhaps the calculations can be performed less frequently.

The foregoing description has been directed to particular embodiments of the invention. It will become apparent, however, that other variations and modifications may be made to the described embodiments, with the attainment of some or all of their advantages. For example, although the embodiments described herein include multiple computing systems of a distributed storage management system, one of ordinary skill in the art will realize that at least one computing device can perform all the operations described herein.

With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, optical signals, or the like, that are capable of being stored, transferred, combined, compared, and otherwise manipulated. Any of the operations described herein that form part of the invention are useful machine operations. Additionally, the procedures, processes, and/or modules described herein may be implemented in hardware, software, embodied as a computer-readable medium having program instructions, firmware, or a combination thereof. Specifically, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), a solid state device (SSD), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc. Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A computing device implemented method for performing data operations within a computing environment, comprising:
    a repository volume table module storing repository characteristic information in a repository volume table (RVT) concerning a plurality of data repositories storing data from data sources;
    determining an occurrence of a data backup operation to backup data from the data sources;
    in response to determining the occurrence of the data backup operation, selecting one of the data repositories for performing the determined data backup operation by using a selection module, wherein the selection module analyzes the repository characteristic information and incoming data information from the data sources for the occurring data backup operation to select at least one of the data repositories, wherein different repositories are selected for different occurring data backup operations with respect to the data sources depending on the selection module analysis of the repository characteristic information and the incoming data information for the data backup operation; and
    providing an emulated view of data stored on the data repositories providing backups and a logical view of the data in the data sources at a point-in-time, wherein the logical view provides access and restore of backup data as of the point-in-time.

2. The computing device implemented method of claim 1, further comprising providing the emulated view with the loss of at least one data repository.

3. The computing device implemented method of claim 1, further comprising a selection score determined from analyzing the repository characteristic information and incoming data information.

4. The computing device implemented method of claim 3, wherein the repository characteristic information includes at least one of: current active job information, current capacity utilization information, current performance utilization information, performance configuration information, availability configuration information, affinity information, and operation type information.

5. The computing device implemented method of claim 4, wherein the selection score includes at least one weighted value to determine if any single repository characteristic information is more or less important than another.

6. The computing device implemented method of claim 1, further comprising maintaining the RVT continuously or on a periodic basis.

7. A method of selecting a data repository of a distributed storage management system, the distributed storage management system containing at least one source computing system coupled to at least one target computing system, the method comprising:
    storing repository characteristic information in a repository volume table (RVT) concerning a plurality of data repositories storing data from the at least one source computing system of a data protection system of the distributed management system by using a repository volume table module;
    determining an occurrence of a data backup operation to backup data from the at least one source computing system;
    in response to determining the occurrence of the data backup operation, selecting one of the data repositories from at least one target computing system for performing the determined data backup operation by using a selection module of the data protection system, wherein the selection module analyzes the repository characteristic information and incoming data information from the at least one source computing system to select at least one of the data repositories, wherein different repositories are selected for different occurring data backup operations with respect to the at least one source computing system depending on the selection module analysis of the repository characteristic information and the incoming data information for the data backup operation; and
    providing an emulated view of data stored on the data repositories of at least one target computing system providing backups and a logical view of the data in the data sources at a point-in-time, wherein the logical view provides access and restore of backup data as of the point-in-time.

8. The method of claim 7, further comprising providing the emulated view with the loss of at least one data repository.

9. The method of claim 7, further comprising a selection score determined from analyzing the repository characteristic information and incoming data information.

10. The method of claim 9, wherein the repository characteristic information includes at least one of: current active job information, current capacity utilization information, current performance utilization information, performance configuration information, availability configuration information, affinity information, and operation type information.

11. The method of claim 10, wherein the selection score includes at least one weighted value to determine if any single repository characteristic information is more or less important than another.

12. The method of claim 7, further comprising maintaining the RVT continuously or on a periodic basis.

13. A computing environment, comprising:
a source computing system having source information;
a data protection system coupled to the source computing system, wherein the data protection system includes a processor and memory, the memory storing instructions executed by the processor to perform operations, the operations comprising:
obtaining repository characteristic information concerning a plurality of data repositories storing data from the source computing system from a repository volume table (RVT);
determining an occurrence of a data backup operation to backup data from the source computing system;
in response to determining the occurrence of the data backup operation, selecting one of the data repositories for performing the determined data backup operation by using a selection module, wherein the selection module analyzes the repository characteristic information and incoming data information from the data sources for the occurring data backup operation to select at least one of the data repositories, wherein different repositories are selected for different occurring data backup operations with respect to the source computing system depending on the selection module analysis of the repository characteristic information and the incoming data information for the data backup operation; and
providing an emulated view of data stored on the data repositories providing backups and a logical view of the data in the source computing system at a point-in-time, wherein the logical view provides access and restore of backup data as of the point-in-time.

14. The computing environment of claim 13, wherein the emulated view is a logical view of data stored on at least one data repository.

15. The computing environment of claim 14, wherein data can be inaccessible because of bad blocks of at least one data repository.

16. The computing environment of claim 13, further comprising a selection score determined by the processor based on analyzing the repository characteristic information and incoming data information.

17. The computing environment of claim 16, wherein the incoming data information includes at least one of: a source computing system identifier, a service level objective, an application identifier, a volume identifier and data to be protected.

18. The computing environment of claim 16, wherein the repository characteristic information includes at least one of: current active job information, current capacity utilization information, current performance utilization information, performance configuration information, availability configuration information, affinity information, and operation type information.

19. The computing environment of claim 18, wherein the selection score includes at least one weighted value to determine if any single repository characteristic information is more or less important than another.

20. The computing environment of claim 13, further comprising maintaining the RVT continuously or on a periodic basis.

* * * * *